United States Patent

[11] 3,527,129

| [72] | Inventor | Werner Hugo Schiesser<br>Hortensienstrasse 9, Zurich, Switzerland |
|---|---|---|
| [21] | Appl. No. | 754,903 |
| [22] | Filed | Aug. 23, 1968 |
| [45] | Patented | Sept. 8, 1970 |
| [32] | Priority | Aug. 24, 1967 |
| [33] | | Switzerland |
| [31] | | No. 12001/67 |

[54] AUTOMATIC APPARATUS FOR ACCURATELY CUTTING TO SIZE EXTRUDED LENGTHS OF SOLID AND TUBULAR MATERIAL
4 Claims, 4 Drawing Figs.

[52] U.S. Cl. ................................................. 83/287,
83/289, 83/354, 83/595
[51] Int. Cl. ............................................... B23d 25/16,
B26d 1/56
[50] Field of Search ................................... 83/110,
156, 287, 289, 354, 365, 341, 595

[56] References Cited

UNITED STATES PATENTS

| 1,946,457 | 2/1934 | Donnelley et al. | 83/289 |
| 1,947,399 | 2/1934 | Umansky | 83/287X |
| 3,105,405 | 10/1963 | Bessonny | 83/287X |
| 3,442,168 | 5/1969 | Gatto | 83/354 |

*Primary Examiner*—Frank T. Yost
*Attorney*—Browdy and Neimark

ABSTRACT: Automatic apparatus for accurately cutting extruded lengths of solid or tubular material to size by means of an electromagnetic rapidly acting brake and a rapidly acting clutch which are alternately engaged and released in accordance with control pulses from a photo-electric cell through an electronic control device thereby actuating the cutting knife at the proper intervals.

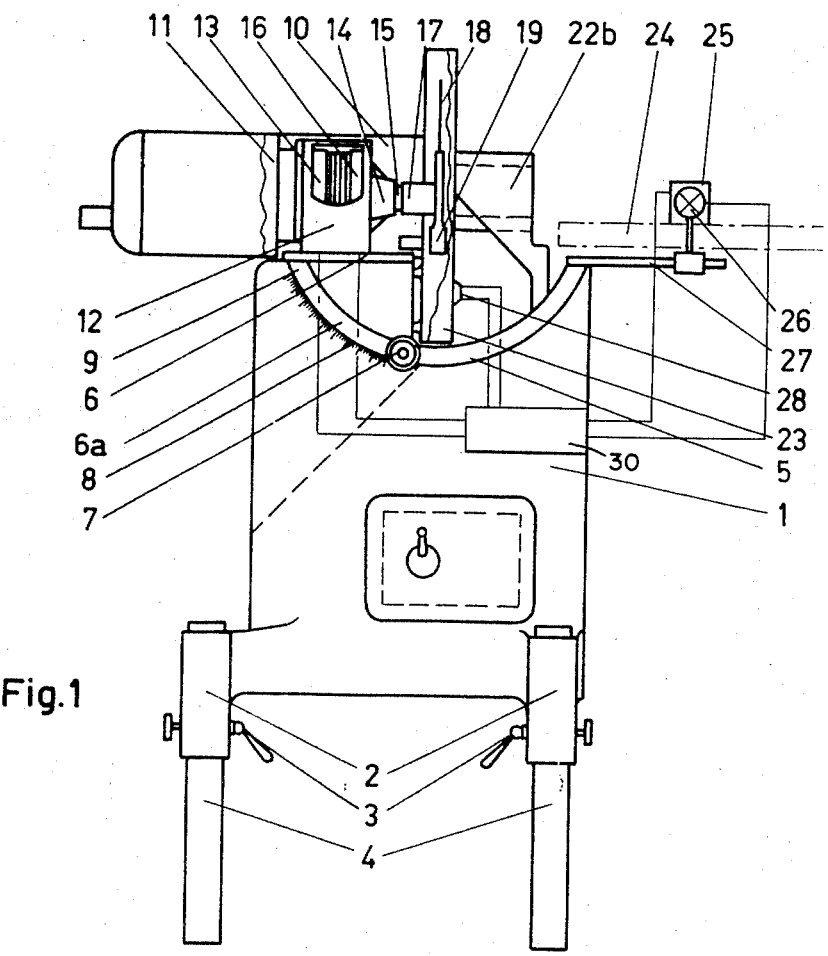
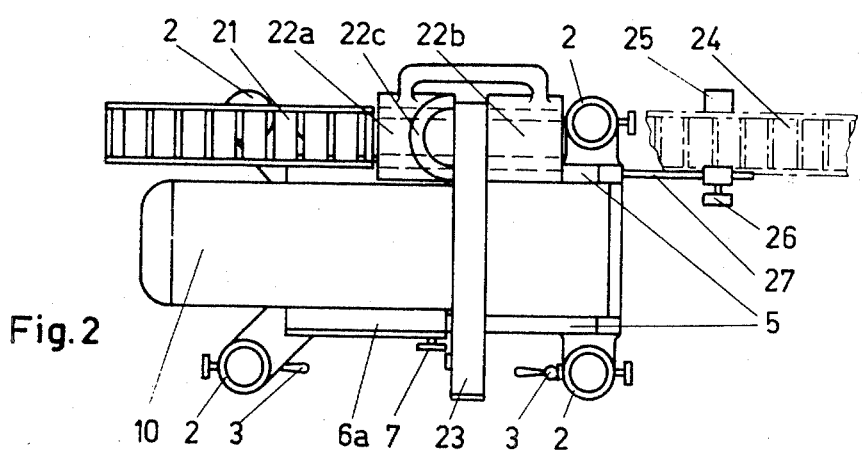

AUTOMATIC APPARATUS FOR ACCURATELY CUTTING TO SIZE EXTRUDED LENGTHS OF SOLID AND TUBULAR MATERIAL

The invention relates to an automatic apparatus for accurately cutting to size extruded lengths of solid and tubular material.

Both in the synthetic plastics industry and in particular in the rubber industry, the operation of cutting to size extruded lengths of solid or tubular material is usually carried out with auxiliary apparatus which are quite inadequate for the purpose; this is true whether the extruded materials are cut into sections directly after they emerge from the extrusion press or subsequently, for example after vulcanisation of lengths of rubber material. For the production of so-called elbows, that is to say bent tube sections which are used for water pipes in motor cars and the like, blanks have to be used which must be cut up to a specified length. Rubber blanks of this kind have hitherto been cut to length immediately after they have emerged from the extrusion press in unvulcanised condition, the required length being increased by a certain additional amount. This additional amount added to the length of the cut-off extruded sections is absolutely essential because, firstly, a certain shrinkage of the cut-off sections occurs during subsequent vulcanisation —although it is true that the amount of this shrinkage can be accurately assessed—and, secondly, by reason of the fact that it has only been possible to obtain an inaccurate cut with the apparatus which have hitherto been used. The inaccuracy of the length of the cut-off sections of extruded material has led to considerable difficulties in the past. The cut-off sections of extruded material which have been vulcanised must be delivered with strictly straight surfaces in the region in which they have been severed from the main length of extruded material. If it is impossible to cut the unvulcanised tubular section in a satisfactory manner, then obviously the finished (vulcanised) section will also be unsatisfactory, as in the course of vulcanisation the end surfaces of the cut-off section maintain practically the same shape as the untreated section after the cutting operation. The length of extruded tube emerging from the extrusion press is still hot and naturally will deform very easily. As a length of tubular material of this kind has not yet been vulcanised, it will easily stick to a certain extent at its cut-off surfaces. It is therefore necessary to allow the length of tubular material to cool to a certain extent before the extruded length is cut to the required size. After vulcanisation has been completed the tubular section must then be accurately cut to size in a further working step. The same is true of extruded lengths of material of any shape, which are cut to length and are then jointed together to form closed frames, such as are for example used for sealing the windows of motor cars and railway carriages (wagons). Thus it is often required to cut the extruded sections so as to form mitred (bevel) joints, the edges of these cut-off sections extending at an angle of up to 45°. Hitherto this has been accomplished in most factories by hand, a large knife being used for the purpose. The operator places the unvulcanised or vulcanised section of extruded material into a jig in the form of a bar of U-shaped cross-section, in whose side walls guide slots, extending in the required cutting angle, are provided for the knife. This mode of procedure has naturally been very time-consuming and, in spite of all efforts made by the operator, has not usually resulted in absolutely clean cuts being made. All these defects and drawbacks can be remedied by the invention. The invention consists in automatic apparatus for automatically cutting into sections lengths of solid or tubular extruded material, with a box-like supporting frame, in which there is provided, on the box-like supporting frame, a support on which is mounted an electric motor whose shaft is adapted to be coupled, by means of an electromagnetic, rapid acting clutch, to a shaft on whose free end there is mounted a rotor with a radially projecting, counterweighted cutting knife, there being provided for the said shaft an electromagnetic rapid-acting brake which so co-operates with the said rapid-acting clutch that the brake is released when the rapid-acting clutch is in its engaged condition and is applied when the rapid-acting clutch is disengaged; on the other side of the supporting frame there is fixed a support on which there is provided a roller conveyor along which the length of solid or tubular extruded material is passed; lying adjacent to and following the said roller conveyor is a guide bushing which is disposed on the same support as the said roller conveyor, and which consists of two parts lying coaxial with respect to one another and separated by a space through which the cutting knife can move; in the supporting frame there is provided an electronic control device for the rapid-acting clutch and the rapid-acting brake and which receives the control pulse, for engaging the rapid-acting clutch and for releasing the rapid-acting brake, from a photoelectric cell with its associated light source, the photoelectric cell and its associated light source being arranged on a bracket which lies in front of the said supporting frame, in the region of the conveyor device which discharges the cut sections of solid or tubular extruded material, and at an adjustable distance from the cutting plane of the cutting knife, and the sections of solid or tubular extruded material which have been cut to length run between the said photoelectric cell and light source; the said control device receiving the control pulse for disengaging the rapid-acting clutch and for applying the rapid-acting brake from an oscillator control organ which is affected in contact-free manner by the cutting knife.

When the apparatus has been correctly adjusted for the work which is to be carried out, it operates in continuous manner and without any need for supervision. Owing to its high speed of cutting it is possible accurately to cut to length lengths of solid or tubular extruded material of any cross-sectional shape, both in the unvulcanised or in the vulcanised condition, the end surfaces of the cut-off solid or tubular extruded sections being completely straight and satisfactory in all respects. As no additional length has to be given to the sections as an allowance for inaccurate cutting or for shrinkage, there will be no wastage and the lengths of solid or tubular extruded material will be substantially completely used up.

Conveniently, the support which carries the electric motor, the rapid-acting clutch and the rapid-acting brake, is capable of being rearwardly tilted by about 45° by means of guide pieces of arcuate shape which are provided on both sides of the support and which are movable in upwardly concave guides which are of complementary shape to the said guide pieces and are arranged in the upper region of both the side walls of the said supporting frame, this support being adapted to be securely clamped in any required position of its range of tilting movement, and the end surface of the rear part of the guide bushing, which lies opposite (faces) the front part of the guide bushing, is rearwardly inclined at an angle of about 45° so as to allow the cutting knife to rotate through the space defined between the two parts of the guide bushing even when the support is in its rearwardly tilted position.

In the embodiment of the machine which has just been described it is possible to cut lengths of solid or tubular extruded material not only in sections having vertical edges but also in mitre or bevel formation, a bevel or mitre angle of about 45° being possible of attainment.

In the drawing there is described an embodiment, provided by way of example, of the automatic apparatus for cutting lengths of extruded solid or tubular material into accurate sections. In these drawings:

FIG. 1 is an elevation of the automatic apparatus for accurately cutting extruded lengths of solid or tubular material into sections, as seen from the side of the apparatus from which adjsutments are made;

FIG. 2 is a plan view of the apparatus;

Figure 3:
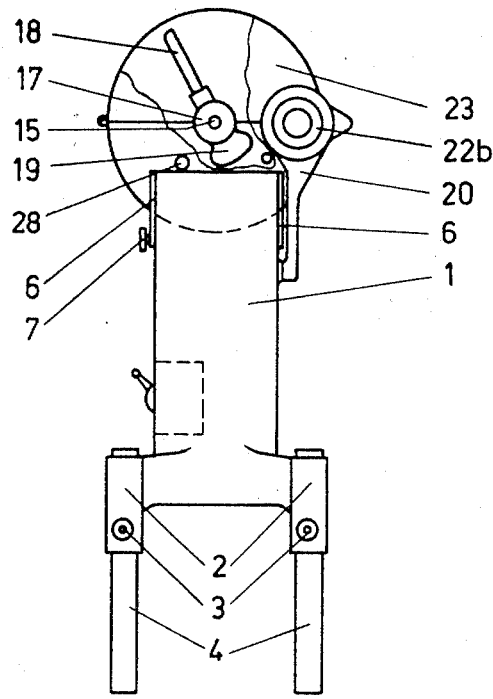
FIG. 3 is a front elevation of the apparatus.

The automatic apparatus which is represented in the drawing and which serves accurately to cut into sections lengths of extruded solid or tubular material comprises a box-like supporting frame or stand 1 which rests on four feet 4 which are adjustable in height in vertical guides 2 and are adapted to be clamped in position by means of clamping screws 3 at any height selected. At both side walls of the supporting frame or stand 1 there is provided upwardly concave guides 5, in which arcuate guide elements 6a are movable, these guide elements 6a being of complementary shape to the guides 5 and being disposed on both sides of a support 6, the arrangement being such that —as is shown in the drawing— this support may assume a horizontal position or a position in which it is rearwardly tilted by about 45°. The support may be securely clamped in position in any desired intermediate position of its range of tilting movement by means of a clamping screw 7. On the side of the supporting frame or stand 1 from which adjustments can be made there extends a scale 8, running adjacent the guide 5, and an indicator mark 9 is provided on the guide element 6a which is movable in the guide 5; the scale 8 and the index mark 9 co-operate to enable the support 8 to be tilted at any specified angle relative to the horizontal. On the support 6 is mounted a housing 10 in which an electric motor 11 is accommodated. A shaft of the electric motor 11 is adapted to be coupled —by means of an electromagnetic rapid-acting clutch 13 which is provided in a special housing 12 which is disposed in the housing 10 and secured to the cover of the housing 10 for the electric motor— to a shaft 15 which is mounted in an extension 14 of the cover of housing 12. An electromagnetic rapid-acting brake 16 is provided to co-operate with the rapid-acting clutch 13 —the brake 16 and the clutch 13 being commonly provided in housing 12— in such manner that when the rapid-acting clutch 13 is engaged the rapid-acting brake 16 will be released, and when the rapid-acting coupling 13 is disengaged the rapid-acting brake 16 will be applied, as will be described in greater detail below. Secured to the free end of the shaft 15 is a rotor 17 on which there is provided a radially projecting cutting knife 18 and a counterweight 19 which serves to balance the cutting knife 18. In the upper region of the side of the supporting stand or frame 1 lying opposite the side thereof from which adjustments are made there is secured a support 20 on which a roller conveyor 21 is provided adjacent and following which lies a guide bushing which consists of two coaxial parts 22a and 22b which are provided at a distance from one another on the support 20. The arrangement is such that the plane in which the cutting knife 18 rotates lies centrally of the intermediate space defined between the two parts 22a and 22b of the guide bushing. In order to allow the support 6, with all the parts mounted thereon including the shaft 15 together with the cutting knife 18, to be rearwardly tilted up to an angle of 45°, the end surface 22c of the rear part 22a of the guide bushing lying opposite (facing) the front part 22b of this guide bushing is rearwardly inclined by an angle of 45°. The rotor 17, the cutting knife 18 and the counterweight 19 are surrounded by a hinged protective housing 23 which is secured to the front end of housing 10; this protective housing 23 however leaves the guide bushing 22a, 22b uncovered. The guide bushing 22a, 22b leads to a second roller conveyor 24 which is driven at a greater speed than the first roller conveyor 21; the second roller conveyor 24 does not form part of the machine being described but forms part of a machine or equipment lying downstream of the machine which is now being described. The roller conveyor 24 may be replaced by any other suitable conveyor device which serves the same purpose.

Figure 4:
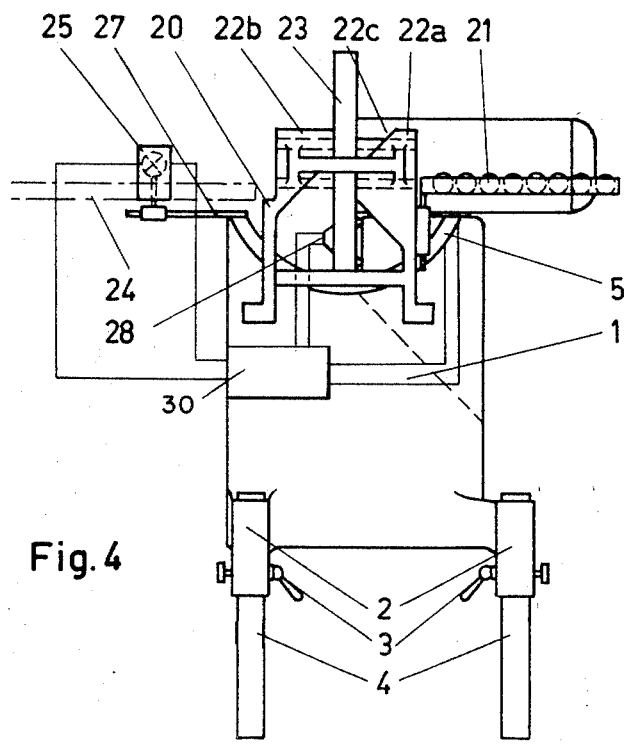
FIG. 4 is a view of the apparatus as seen from the other side.

In the supporting frame or stand 1 there is provided an electric switch for the electric motor 11 and an electronic control device 30, shown diagrammatically in FIGS. 1 and 4 for the rapid-acting clutch 13 and the rapid-acting brake 16, the clutch and brake not being shown in the drawing. This electronic control device receives control pulses first from a photoelectric cell 25 with its associated light source 26, which is provided on a support 27 fixed to the front of the supporting frame 1 in the region of the roller conveyor 24, the arrangement being such that the light beam passing from the light source 26 to the photoelectric cell 25 is interrupted when the length of solid or tubular extruded material passes between the light source and the photocell and, secondly, from an oscillator control organ 28 which is provided on the protective housing 23 at a position corresponding to an angular movement of the cutting knife 18 of about 140° from the axis of the guide bushing 22a, 22b and which is affected in contact-free manner by the cutting knife 18 which moves past the said oscillator control organ 28. A control pulse which is triggered when the beam passing to the photoelectric cell 25 is interrupted causes the electronic control device to engage the rapid-acting clutch 13 and to release the rapid-acting brake 16, and a control pulse passing from the oscillator control organ 28 to the electronic control device causes the electronic control device to disengage the rapid-acting coupling (clutch) 13 and to apply the rapid-acting brake 16.

The electric motor 11 continuously runs while the machine is operative. When work commences, the rapid-acting clutch 13 is disengaged and the rapid-acting brake 16 is applied. The length of solid or tubular extruded material is guided over the roller conveyor 21 into the guide bushing 22a, 22b and reaches the roller conveyor 24. When the end of the length of solid or tubular extruded material passes between the photoelectric cell 25 and the light source 26, the photoelectric current passed by the photoelectric cell 25 is interrupted so that the electronic control device receives a control pulse, which causes the electronic control device to engage the rapid-acting clutch 13 and to release the rapid-acting brake 16. The cutting knife 18, which is initially in the position shown in FIG. 3, immediately starts to rotate with the same speed as that of the shaft of the electric motor 11, and comes into contact with the length of solid or tubular extruded material which passes through the guide bushing 22a, 22b, so that the knife passes through the length of extruded material. As the rotational speed of the cutting knife 18 is very high, the cutting knife cuts through the length of solid or tubular extruded material in a time which amounts to only about six-one thousandths of a second for a diameter of the extruded material of 30 mm.; thus the cutting surface of the cut-off section of extruded material is practically straight, this being true even in the case of lengths of extruded material of very complicated cross-sectional shape. When the cutting knife 18 has passed through an angle of about 140° after cutting through the length of extruded material, it reaches the oscillator control organ 28 and causes the latter to emit a control pulse to the electronic control device, this control pulse causing the electronic control device to disengage the rapid-acting clutch 13 and to apply the rapid-acting brake 16. The shaft 15 together with the rotor 17 is immediately braked thereby, and the cutting knife 18 once again stops in the position shown in FIG. 3. The roller conveyor 21 continuously moves the lengths of solid or tubular extruded material in the forward direction, but owing to the fact that the roller conveyor 24 is driven at a considerably faster speed than the roller conveyor 21, the space between the end of the cut-off section of tubular material and the adjacent-lying end of the length of extruded material being moved along the roller conveyor 21 rapidly increases, so that light from the light source 26 once again strikes the photoelectric cell 25. The above-described working cycle is thus repeated without interruption.

It is possible, by providing the photoelectric cell 25 and the light source 26 at an appropriate distance from the cutting plane of the cutting knife 18, accurately to preselect, to an accuracy of a fraction of a millimetre, the required length of the sections to be cut-off from the continuous length of solid or tubular extruded material. By adjusting the support 6 in an appropriate position, it is also possible to effect oblique cuts of the length of extruded material up to a cutting angle of 45°.

I claim:

1. Automatic apparatus for accurately cutting sections from a length of solid or tubular extruded material, with a box-like supporting frame or stand, in which on the box-like supporting frame there is provided a support on which an electric motor is mounted whose shaft is connected, through the intermediary of an electromagnetic rapidly acting clutch, to a shaft on whose free end there is mounted a rotor with a radially projecting, counterweighted cutting knife, being provided, for the shaft, an electromagnetic rapidly-acting brake which so cooperates with the rapid acting clutch that when the rapid-acting clutch is engaged, the rapid-acting brake is released and when the rapid-acting clutch is disengaged, the rapid-acting brake is applied, there being fixed to one side of the supporting frame a support on which is provided a roller conveyor along which the length of solid or tubular extruded material is passed, lying adjacent to and following the roller conveyor being a guide bushing which is provided on the same support as the roller conveyor and which consists of two parts which are coaxial, and are separated from one another by a space through which the cutting knife rotates, an electronic control device for the rapid-acting coupling and for the rapid-acting brake being provided on the supporting frame and receiving the control pulse, for engaging the rapid-acting clutch and for releasing the rapid-acting brake, from a photo-electric cell with its associated light source, this photoelectric cell being provided, on a bracket which is fixed to the front of the supporting frame, in the vicinity of the conveyor device which removes the cut-off sections of solid or tubular extruded material, and the said photoelectric cell being provided at an adjustable distance from the cutting plane of the cutting knife and the cut-off sections of extruded material passing between the photoelectric cell and its associated light source, and the said electronic control device receiving the control pulse for disengaging the rapid-acting clutch and for engaging the rapid-acting brake from an oscillator control organ which is affected in contact-free manner by the cutting knife.

2. Automatic apparatus according to claim 1, in which the support is rearwardly tiltable by about 45° by means of guide elements which are of arcuate shape and are fixed to the support on both sides thereof, these guide elements being movable in upwardly concave guides which are provided on both side walls of the supporting frame or stand, the support being adapted to be securely clamped by means of a clamping screw at any desired position lying within its range of tilting movement, and the end surface of the rear part of the guide bushing facing the front part of the guide bushing knife being rearwardly inclined at an angle of about 45°, so as to enable the cutting knife (18) to rotate in the space provided for it even when the support is in its rearwardly tilted position.

3. Automatic apparatus according to claim 1 in which a protective housing is provided at the front end of a housing which contains the electric motor and also the rapid-acting clutch and the rapid-acting brake, this protective housing enclosing the rotor and the cutting knife but leaving the guide bushing uncovered, and an oscillator control organ which is affected by the cutting knife being provided on this protective housing.

4. Automatic apparatus according to claim 2 in which a protective housing is provided at the front end of a housing which contains the electric motor and also the rapid-acting clutch and the rapid-acting brake, this protective housing enclosing the rotor and the cutting knife but leaving the guide bushing uncovered, and an oscillator control organ which is affected by the cutting knife being provided on this protective housing.